US011245298B2

(12) United States Patent
Ding

(10) Patent No.: US 11,245,298 B2
(45) Date of Patent: Feb. 8, 2022

(54) OUTER ROTOR BRUSHLESS MOTOR

(71) Applicant: NINGBO FUJIA INDUSTRIAL CO., LTD., Ningbo (CN)

(72) Inventor: Fenghong Ding, Ningbo (CN)

(73) Assignee: NINGBO FUJIA INDUSTRIAL CO., LTD., Ningbo (CN)

( * ) Notice: Subject to any disclaimer, the term of this patent is extended or adjusted under 35 U.S.C. 154(b) by 104 days.

(21) Appl. No.: 16/718,190

(22) Filed: Dec. 18, 2019

(65) Prior Publication Data

US 2020/0403471 A1 Dec. 24, 2020

(30) Foreign Application Priority Data

Jun. 19, 2019 (CN) .......................... 201910530390.6

(51) Int. Cl.
*H02K 1/27* (2006.01)
*H02K 1/28* (2006.01)
*H02K 5/22* (2006.01)

(52) U.S. Cl.
CPC ............. *H02K 1/28* (2013.01); *H02K 1/2786* (2013.01); *H02K 5/22* (2013.01)

(58) Field of Classification Search
CPC .......... H02K 1/28; H02K 1/2786; H02K 5/22; H02K 21/22; H02K 1/22; H02K 29/00
See application file for complete search history.

(56) References Cited

U.S. PATENT DOCUMENTS

| 7,545,067 B2* | 6/2009 | Drexlmaier ............ H02K 1/278 310/156.08 |
| 2013/0009494 A1* | 1/2013 | Oguma ................. F04D 25/064 310/43 |
| 2015/0214796 A1* | 7/2015 | Chen ..................... F04D 29/282 417/420 |
| 2019/0288569 A1* | 9/2019 | Baer ........................ H02K 1/02 |

FOREIGN PATENT DOCUMENTS

| CN | 206922549 U | 1/2018 |
| CN | 208028674 U | 10/2018 |
| DE | 102007037581 A1 * | 2/2008 | ........... H02K 7/1815 |
| TW | M361169 U * | 7/2009 | ............... H02K 1/22 |

OTHER PUBLICATIONS

Machine Translation, Huang, TW M361169 U, Jul. 2009. (Year: 2009).*
Machine Translation, Maier, DE-102007037581-A1, Feb. 2008. (Year: 2008).*

* cited by examiner

*Primary Examiner* — Thomas Truong
(74) *Attorney, Agent, or Firm* — Bayramoglu Law Offices LLC

(57) ABSTRACT

The technical scheme adopted by the present disclosure discloses an outer rotor brushless motor, which has a motor housing, a magnet, an end cover and a retainer ring, and a plurality of mounting separators all integrally molded with the motor housing are evenly distributed on the inner wall of the motor housing; between two adjacent mounting separators, a mounting groove is provided for a magnet to be (Continued)

mounted; the magnet is mounted within the mounting groove and is axially limited by means of the end cover and the retainer ring. The outer rotor brushless motor disclosed offers good reliability and high efficiency in assembly.

8 Claims, 4 Drawing Sheets

OUTER ROTOR BRUSHLESS MOTOR

CROSS-REFERENCE TO RELATED APPLICATIONS

This application claims priority to Chinese Patent Application No. 201910530390.6 with a filing date of Jun. 19, 2019. The content of the aforementioned application, including any intervening amendments thereto, are incorporated herein by reference.

TECHNICAL FIELD

The present disclosure relates to the technical field of brushless motors, in particular to an outer rotor brushless motor.

BACKGROUND

The structure of an outer rotor motor, as compared with an inner rotor motor, has a certain advantages in the aspects of noise, rotational inertia, cost of enameled wires and the like. In addition, it also features in high power density, compact structure, long service life, safety and reliability, and thus has been applied by more and more manufacturers.

Yet the outer rotor motor in the prior art, such as the one disclosed in the Chinese invention patent with the publication No.: CN 206922549U, comprises a magnet that is separated and fixed by a magnet fastener on the inner wall of a motor housing, however the magnet fastener needs to be mounted on the inner wall of the motor housing by virtue of an additional fixing structure, leading to lower assembly efficiency and poor reliability. Further, by taking the outer rotor motor disclosed in the Chinese invention patent with the publication No.: CN 208028674U as another example, its magnet is separated and fixed by an installation structure on an end cover, making it inconvenient for assembly.

SUMMARY

The technical problem to be solved by the present disclosure is to provide an outer rotor brushless motor with good reliability and high efficiency in assembly.

The technical scheme adopted by the present disclosure discloses an outer rotor brushless motor, which comprises a motor housing, a magnet, an end cover and a retainer ring, and a plurality of mounting separators all integrally molded with the motor housing are evenly distributed on the inner wall of the motor housing; between two adjacent mounting separators, a mounting groove is provided for a magnet to be mounted; the magnet is mounted within the mounting groove and is axially limited by means of the end cover and the retainer ring.

In some embodiment, the mounting separator is a single rib.

In some embodiment, the mounting separator is composed of two ribs arranged side by side.

In some embodiment, the length of the rib is shorter than that of the magnet.

In some embodiment, the rib has a cross section of a trapezoid.

In some embodiment, the height of the cross section of the rib exceeds the height of the magnet.

In some embodiment, after the retainer ring is mounted inside one end of the motor housing, the external surface of the retainer ring levels with the external surface of one end of the motor housing.

In some embodiment, the distance between the rib and one end of the motor housing is less than that between the rib and the other end of the motor housing.

With the abovementioned structure, as compared to the prior art, the outer rotor brushless motor disclosed by the present disclosure has the following advantages: the mounting separators are integrally molded on the inner wall of the motor housing, when installing the magnet into the mounting groove between two mounting separators, an axial limitation is achieved by the end cover and the retainer ring, therefore, the outer rotor brushless motor with this structure is free from the assembly of mounting separators during assembly, thereby improving the assembly efficiency. Further, a good reliability is ensured since the magnet is positioned and fixed by means of the mounting separators, together with the retainer ring and the end cover.

Such a simple structure that a rib serves as a mounting separator brings convenience in integral molding.

Adopting two side-by-side ribs as a mounting separator makes the separating effect better.

The length of the rib is shorter that of the magnet, in such case, when the magnet is mounted between the two ribs, a portion of the magnet at each of two ends of the rib stretches out of the mounting groove, that is, the retainer ring and the end cover prop up the portions of the magnet stretching out of the mounting groove, producing a good axial limiting effect.

A trapezoidal cross section of the rib not only matches the shape of the magnet but also facilitates fixation of the magnet.

As the height of the cross section of the rib exceeds the height of the magnet, the two magnets are well separated by the ribs, producing a good separating effect.

Such arrangement that the external surface of the retainer ring levels with the external surface of the motor housing endows an assembled motor with higher reliability.

Figure 1:
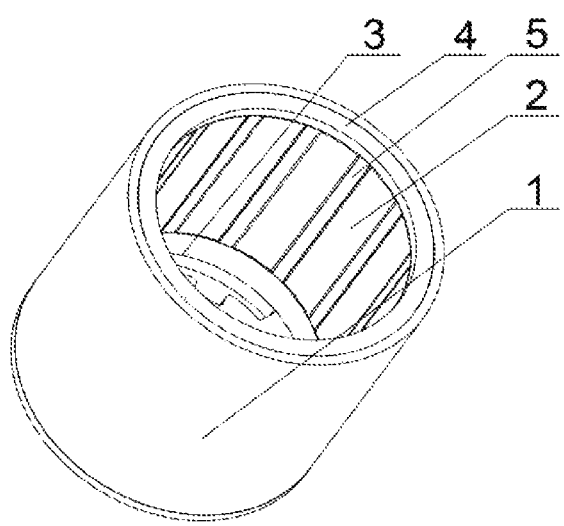
FIG. 1 is a schematic diagram of a partial structure in Embodiment One of an outer rotor brushless motor of the present disclosure.

The reference numerals denote that: 1 motor housing; 2 magnet; 3 end cover; 4 retainer ring; 5 rib; 6 mounting groove.

DETAILED DESCRIPTION OF THE EMBODIMENTS

The present disclosure will be further described in combination with the following particular embodiments, but are not intended to limit thereto.

Figure 2:
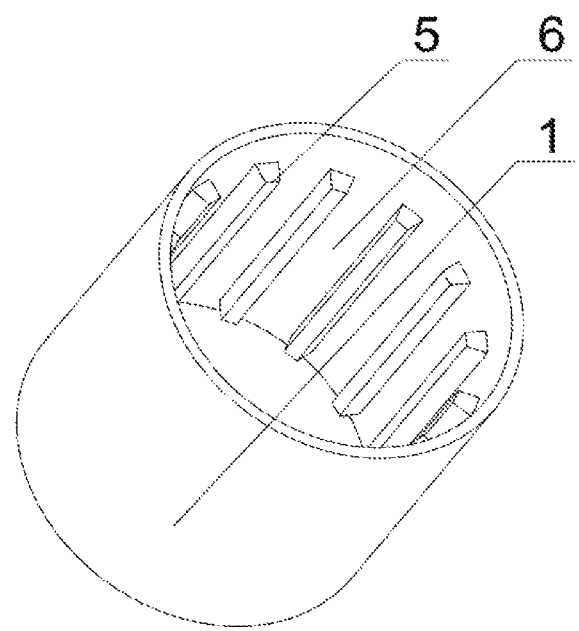
FIG. 2 is a schematic structural diagram of a motor housing in Embodiment One of the outer rotor brushless motor of the present disclosure.

Embodiment One: as shown in FIGS. 1-2, an outer rotor brushless motor comprises a stator and a rotor, the rotor including a motor housing 1, a magnet 2, an end cover 3 and a retainer ring 4, ribs 5 integrally molded with the motor housing 1 are distributed on the inner wall of the motor housing 1 in an equant manner. A mounting groove 6 is formed between the inner wall of the motor housing 1 and two adjacent ribs 5. In this embodiment, 14 ribs 5 are evenly distributed on the inner wall of the motor housing 1. The rib 5 with a trapezoidal cross section wells matches the shape of the magnet 2. The rib 5 has the length (i.e., vertical height of the rib) slightly less than that of the magnet 2, therefore, when the magnet 2 is mounted in the mounting groove 6 between two ribs 5, two ends of the magnet 2 stretch out a little bit, so that the retainer ring 4 and the end cover 3 prop up the two ends of the magnet 2 so as to further axially limit the magnet 2. The magnets 2 at two sides of the ribs are separated from each other as a result of the cross section of the rib 5 is higher than the cross section of magnet 2.

The magnet 2 as a conventional magnet applied in the outer rotor brushless motor in the prior art, is mounted in the mounting groove 6, and then both of its left and right two sides are completely blocked by the rib 5, that is to say, the rib 5 separates the magnets 2 in the adjacent mounting grooves 6. Moreover, 14 magnets 2 are provided in the present embodiment, matching with the quantity of ribs 5.

The retainer ring 4 is mounted on one end of the motor housing 1, mainly used for propping up one end of the magnet 2; when the retainer ring 4 is mounted inside one end of the motor housing 1, the external surface of the retainer ring 4 levels with the external surface of one end of the motor housing 1.

In the present embodiment, the structure for limiting the magnet 2 is cancelled from the end cover 3, that is to say, only a circle of bulges of the end cover 3 contacts the magnet 2. In such a case, the end cover 3 is mounted on the other end of the motor housing 1, and the circle of bulges props up the other end of the magnet 2. Further, the distance between the rib 5 and the other end of the motor housing 1 is longer than the distance between the rib 5 and one end of the motor housing 1, which means that the space reserved for installation of the retainer ring 4 is much smaller than that reserved for the end cover 3, because the retainer ring 4 doesn't occupy a large installation space due to its small volume while the end cover 3 is big in size. To ensure fastness of the end cover 3 after installation, a large space needs to be reserved for installation of the end cover 3 when inserting for installation.

The stator comprises a shaft in interference fit with the end cover 3 depending on the physical property of large friction coefficient of stainless steel and aluminum, therefore, the shaft and the end cover 3 are in firm fit with each other and stable in quality.

Figure 3:
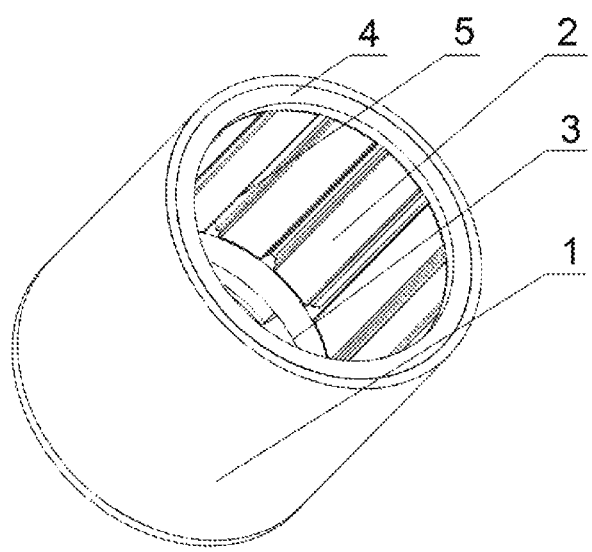
FIG. 3 is a schematic diagram of a partial structure in Embodiment Two of the outer rotor brushless motor of the present disclosure.
Figure 4:
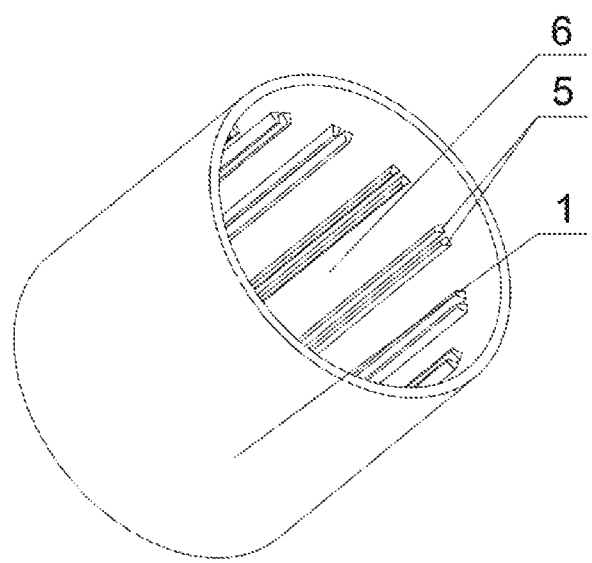
FIG. 4 is a schematic structural diagram of a motor housing in Embodiment Two of the outer rotor brushless motor of the present disclosure.

Embodiment Two: as shown in FIGS. 3-4, differing from Embodiment One, the rib sets integrally molded with the motor housing 1 are distributed on the inner wall of the motor housing 1 in an equant manner, and each rib set comprises two ribs 5 arranged side by side; each rib 5 in the rib set has a structure as similar as a single rib in Embodiment One and also has a trapezoidal cross section. A gap between two ribs 5 of a rib set is reserved for reversal installation of one rib 5, producing an effect equivalent to that in the Embodiment One, i.e., one rib is divided into three portions, and then the middle portion is removed, such arrangement not only save a portion of cost by avoiding using wider ribs in the need of increasing the separating distance, but also produces a better separating effect as the magnet 2 is separated by two ribs 5.

It should be noted that, the above embodiments merely serve to explain the technical solutions of the present invention, but are not intended to limit thereto. Although this invention has been explained in detail with reference to the above embodiments, it should be understood by those skilled in the art that many modifications on the technical solutions contained in the above embodiments or equivalent substitutions for partial technical features are possible. Further, these modifications or substitutions made will not cause the respective technical solutions to materially depart from the spirit and scope of the technical solutions disclosed by the above embodiments of the present disclosure.

What is claimed is:

1. An outer rotor brushless motor, comprising a motor housing, a magnet, an end cover and a retainer ring, wherein a plurality of mounting separators all integrally molded with the motor housing are evenly distributed on an inner wall of the motor housing; a mounting groove for a magnet to be mounted is provided between two adjacent mounting separators; the magnet is mounted within the mounting groove and is axially limited by the end cover and the retainer ring, wherein a length of the rib is shorter than the length of the magnet.

2. The outer rotor brushless motor of claim 1, wherein the mounting separator is a single rib.

3. The outer rotor brushless motor of claim 2, wherein a cross section of the rib is of the shape of a trapezoid.

4. The outer rotor brushless motor of claim 2, wherein a height of the cross section of the rib exceeds the height of the magnet.

5. The outer rotor brushless motor of claim 1, wherein the mounting separator is composed of two ribs arranged side by side.

6. The outer rotor brushless motor of claim 5, wherein a cross section of the rib is of the shape of a trapezoid.

7. The outer rotor brushless motor of claim 5, wherein a height of the cross section of the rib exceeds the height of the magnet.

8. The outer rotor brushless motor of claim 1, wherein the retainer ring is mounted inside one end of the motor housing, and an external surface of the retainer ring levels with the external surface of one end of the motor housing.

* * * * *